United States Patent [19]

Rundell

[11] 4,275,588
[45] Jun. 30, 1981

[54] HEAVY DUTY DYNAMIC HIGH-TORQUE-MEASUREMENT COUPLING UNIT

[75] Inventor: Herbert A. Rundell, Houston, Tex.

[73] Assignee: Texaco Inc., White Plains, N.Y.

[21] Appl. No.: 108,869

[22] Filed: Dec. 31, 1979

[51] Int. Cl.³ .............................................. G01L 3/14
[52] U.S. Cl. ................................................. 73/862.32
[58] Field of Search ............ 73/133 R, 136 A, 136 B, 73/136 C

[56] References Cited

U.S. PATENT DOCUMENTS

| | | | |
|---|---|---|---|
| 3,823,607 | 7/1974 | Rundell | 73/136 A |
| 4,094,192 | 6/1978 | Watson et al. | 73/133 R |
| 4,122,709 | 10/1978 | Brown et al. | 73/136 A |
| 4,136,559 | 1/1979 | Brown | 73/136 A |
| 4,186,596 | 2/1980 | Böhringer et al. | 73/136 C |

FOREIGN PATENT DOCUMENTS 2020441  11/1979  United Kingdom ................ 73/136 C Primary Examiner—Charles A. Ruehl
Attorney, Agent, or Firm—Carl G. Ries; Robert A. Kulason; Henry C. Dearborn

[57] ABSTRACT

A heavy-duty large-torque deflection unit. It will couple a shaft to a laterally located chain drive. It includes mechanical elements that are used in making dynamic measurement of relative angular displacement at the deflection unit.

7 Claims, 3 Drawing Figures

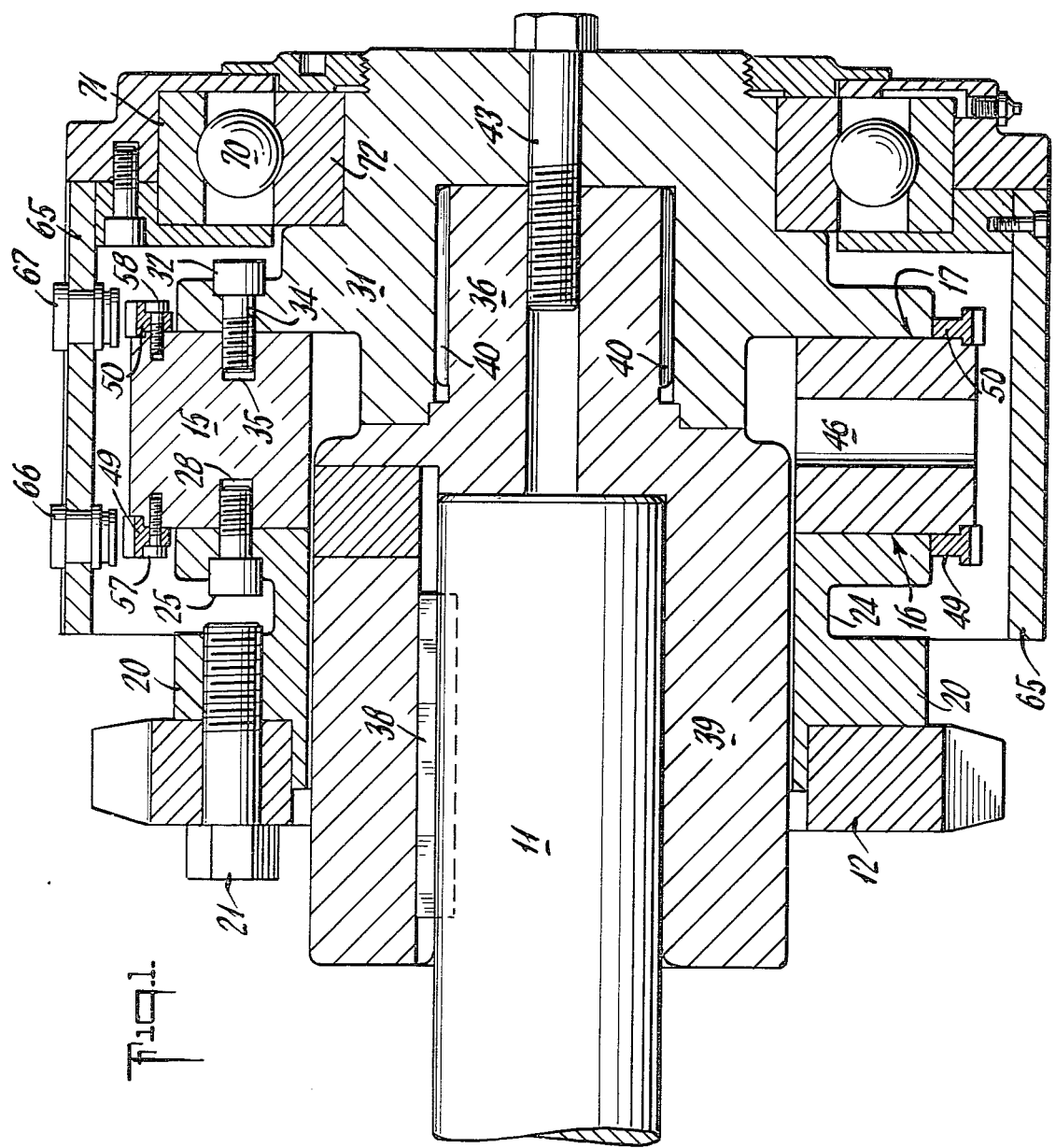

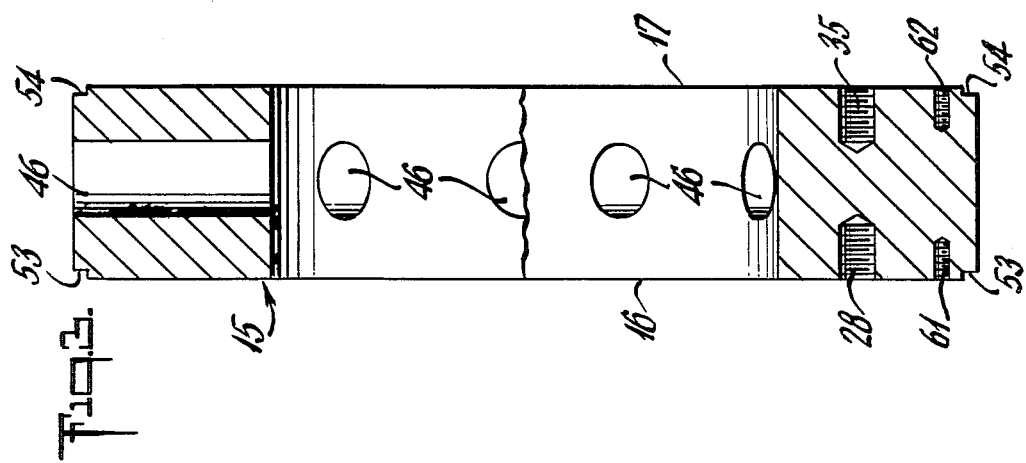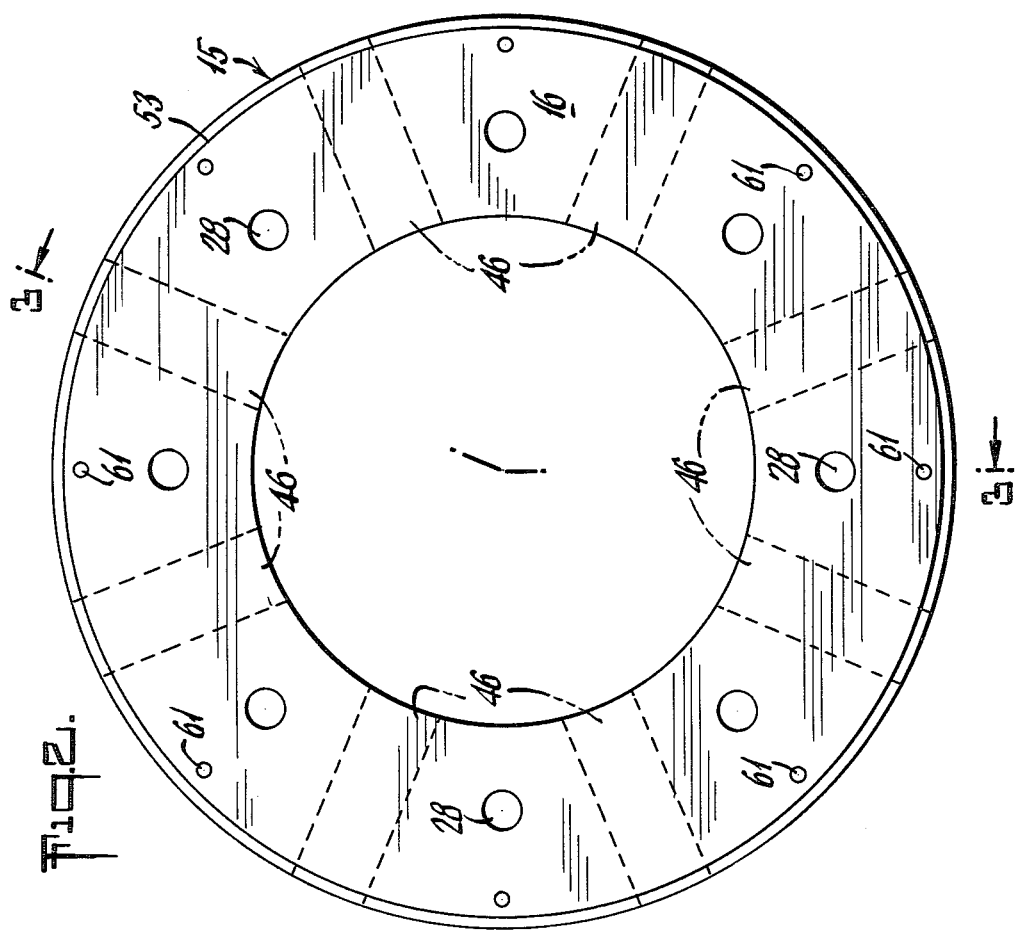

HEAVY DUTY DYNAMIC HIGH-TORQUE-MEASUREMENT COUPLING UNIT

BACKGROUND OF THE INVENTION

1. Field of the invention

This invention concerns a mechanical torque coupling structure, in general. More specifically, it relates to a heavy duty torque-shaft coupling unit that is employed to transfer torque energies laterally with respect to the axis of the torque shaft.

2. Description of the Prior Art

In connection with oil-well drilling and similar activities, there is a continuing need for a heavy-duty and yet sensitive dynamic torque meter. While a torque meter coupling structure has been proposed in my earlier U.S. Pat. No. 3,823,607, issued July 16, 1974, that structure makes use of a sleeve to create the required deflection for measuring the torque and consequently it requires considerable longitudinal space relative to the axis of the shaft involved. Since that time, and in view of the development of a more sensitive system for measuring deflection of torque elements such as disclosed in the U.S. patents assigned to the same assignee as this application, i.e. U.S. Pat. Nos. 4,122,709 and 4,136,559, it has been discovered that a structure with greatly shortened longitudinal dimension could be employed.

Thus it is an object of this invention to provide a heavy-duty large torque deflection unit that is applicable to the torque measurement of a chain-drive deepwell rotary hook up.

SUMMARY OF THE INVENTION

Briefly, the invention concerns a heavy-duty dynamic high-torque measurement coupling unit for interconnecting a torque-load transmitting shaft with a lateral drive. It comprises in combination an annular transmitting element having a pair of opposed faces spaced axially apart. It also comprises gear means rigidly attached to one of said faces for coupling said lateral drive, and means for rigidly attaching said shaft to the other of said faces. It also comprises means for dynamically measuring the amount of relative angular displacement between said faces. The said annular element has radial openings between said faces, to permit said relative angular displacement under torque load.

Once more briefly, the invention concerns a heavy duty dynamic high-torque measurement coupling unit for interconnecting a torque-load-transmitting shaft with a lateral drive. It comprises in combination an annular unitary torque transmitting element having a pair of opposed faces spaced axially apart. The annular torque element comprises a rectangular cross-section, and a plurality of symmetrically located radial holes extending through the body of said element between said faces. The coupling unit also comprises a heavy-duty gear means rigidly attached to one of said opposed faces for coupling said lateral drive. It also comprises means for rigidly attaching said shaft to the other of said opposed faces, and means for dynamically measuring the amount of relative angular displacement between said opposed faces. The last named dynamic measuring means comprises a pair of ring gears, one attached to each of said opposed faces at the periphery thereof for maintaining angular correspondence therewith at all times, and a stationary housing. It also comprises a pair of transducers carried by said housing, one cooperating with each of said ring gears for developing signals in order to measure said dynamic relative angular displacement.

BRIEF DESCRIPTION OF THE DRAWINGS

The foregoing and other objects and benefits of the invention will be more fully set forth below in connection with the best mode contemplated by the inventor of carrying out the invention, and in connection with which there are illustrations provided in the drawings, wherein:

FIG. 1 is a longitudinal cross-section showing a coupling unit according to the invention, FIG. 2 is a side elevation showing the deflection element alone as employed in the unit illustrated in FIG. 1, and FIG. 3 is a cross-sectional view of the deflection element illustrated in FIG. 2, taken along the lines 3—3 on FIG. 2.

DESCRIPTION OF THE PREFERRED EMBODIMENT

In oil well drilling operations, it is highly desirable to be able to measure the torque being applied during the actual drilling of a well. However, the equipment (particularly for deep well drilling) is large and heavy duty, and the torque loads applied are great. Many such drilling operations employ a drive coupling that has lateral input to the shaft which is connected into the rotary, for applying the torque to the drill string. Such lateral application of the torque is by a chain drive coupling, and very often there is a premium on space requirements, so that while a coupling unit has been developed by me (as illustrated in the above mentioned U.S. Pat. No. 3,823,607) it had the drawback of employing considerable longitudinal distance relative to the shaft that is being coupled to the input drive. Now, a much more compact construction has been developed in accordance with this invention.

With reference to the drawings, it will be observed that there is a shaft 11 that transmits a torque load such as the load applied to the rotary of a drilling operation. A lateral drive may be applied to the shaft 11 by use of a chain (not shown) that connects the load onto a heavy duty sprocket, or gear 12.

There is an annular deflection element 15. This deflection element 15 is for transmitting the torque load between the shaft 11 and the gear 12. It has two faces 16 and 17, and the gear 12 is rigidly attached to the face 16 by any feasible connecting structure such as the illustrated collar 20, to which the gear 12 is bolted by a plurality of bolts like a bolt 21 shown in FIG. 1. The collar 20 has a groove 24 to accommodate another series of shorter bolts like a bolt 25. These bolts 25 fasten into female threaded holes 28 on the face 16 of the deflection element 15.

The other face 17 of the annular element 15 has a flange 31 attached securely thereto in a similar manner as the collar 20 is attached to the face 16. In this case there is a series of bolts 32 that go through holes 34 in the flange 31 and are threadedly received by corresponding female threaded holes 35 on the face 17. The flange 31 is securely fastened onto the end of the shaft 11 by being fitted over a splined hub 36 that is an integral part of a socket 39. The socket 39 is designed for a tight fit onto the shaft 11 by including a key 38 and being heat shrunk onto the shaft 11.

The flange 31 is securely attached onto the hub 36, as indicated above, by employing a splined connection which is indicated by a reference numeral 40. Also, there is an axially located bolt 43 to hold the flange 31 securely onto the splines 40 of the hub 36.

It will be noted that the combination provides a rigid attachment of the shaft 11 via the socket 39 which is keyed to and heat shrunk onto, the shaft 11. It is also integrally attached via the hub 36 to the flange 31. And, flange 31 is securely bolted onto the face 17 of the deflection element 15 all as indicated. The other side of element 15 is rigidly attached to the gear 12 by means of the collar 20 that includes the groove 24 so that one side of the collar 20 is bolted securely onto the other face 16 of the deflection element 15, while the gear 12 is bolted onto the other side of the collar 20.

In order to provide an amount of deflection that may be measured under the various torque loadings, the deflection element 15 has a plurality of holes 46 that are bored radially through and located between the faces 16 and 17 of the deflection element.

In order to make a dynamic measurement of the amount of relative angular displacement between the faces 16 and 17 of deflection element 15, there are a pair of ring gears 49 and 50 which are attached to the faces 16 and 17 respectively, at the periphery of each. Thus, there is a notch 53 and another notch 54 which accommodate the ring gears 49 and 50 respectively. The ring gears 49 and 50 are bolted onto the outer edges of the faces 16 and 17 by means of a plurality of small bolts 57 and 58 respectively that screw into threaded holes 61 and 62 respectively.

There is a stationary housing 65 that supports a pair of transducers 66 and 67, located adjacent to the teeth on each of the ring gears 49 and 50 respectively. The housing 65 is maintained stationary by being mounted on the flange 31 with a ball bearing 70 which has an outer race 71 carried by the housing 65, while an inner race 72 is carried by the flange 31.

While a particular embodiment according to this invention has been described above in considerable detail in accordance with the applicable statutes, this is not to be taken as in any way limiting the invention but merely as being descriptive thereof.

I claim:

1. Heavy-duty dynamic high-torque-measurement coupling unit for interconnecting a torque-load-transmitting shaft with a lateral drive, comprising in combination
   an annular torque transmitting element having a pair of opposed faces spaced axially apart,
   gear means rigidly attached to one of said faces for coupling said lateral drive,
   means for rigidly attaching said shaft to the other of said faces, and
   means for dynamically measuring the amount of relative angular displacement between said faces,
   said element having radial openings between said faces to permit said relative angular displacement under torque load.

2. Heavy-duty dynamic high-torque-measurement coupling unit according to claim 1, wherein
   said annular torque transmitting element has a rectangular cross section.

3. Heavy-duty dynamic high-torque-measurement coupling unit according to claim 2, wherein
   said radial openings are holes.

4. Heavy-duty dynamic high-torque-measurement coupling unit according to claim 3, wherein
   said radial holes are around, and
   said dynamic measuring means comprises a a pair of ring gears attached to said faces at the pheripheries thereof.

5. Heavy-duty dynamic high-torque measurement coupling unit according to claim 4, wherein said combination also comprises
   a pair of transducers carried by said housing and cooperating with said ring gears.

6. Heavy-duty dynamic high-torque-measurement coupling unit according to claim 5, wherein
   said round radial holes are located symmetrically on said annular element.

7. Heavy-duty dynamic high-torque-measurement coupling unit for interconnecting a torque-load-transmitting shaft with a lateral drive, comprising in combination
   an annular unitary torque transmitting element having a pair of opposed faces spaced axially apart and comprising
   a rectangular cross section,
   a plurality of symmetrically located radial holes extending through the body of said element between said faces,
   heavy duty gear means rigidly attached to one of said opposed faces for coupling said lateral drive,
   means for rigidly attaching said shaft to the other of said opposes faces, and
   means for dynamically measuring the amount of relative angular displacement between said opposed faces comprising
   a pair or ring gears, one attached to each of said opposed faces at the periphery thereof for maintaining angular correspondence therewith at all times,
   a stationary housing, and
   a pair of transducers carried by said housing one cooperating with each of said ring gears for developing signals in order to measure said dynamic relative angular displacement.

* * * * *

UNITED STATES PATENT AND TRADEMARK OFFICE
CERTIFICATE OF CORRECTION

PATENT NO. : 4,275,588
DATED : June 30, 1981
INVENTOR(S) : Herbert A. Rundell

It is certified that error appears in the above—identified patent and that said Letters Patent is hereby corrected as shown below:

In column 4, line 15 "around" should read --round--.

Signed and Sealed this

Seventh Day of September 1982

[SEAL]

Attest:

GERALD J. MOSSINGHOFF

Attesting Officer    Commissioner of Patents and Trademarks